(12) United States Patent
Depfenhart

(10) Patent No.: US 9,063,282 B2
(45) Date of Patent: Jun. 23, 2015

(54) LIQUID LENS FOR CONTROLLED SETTING OF A SPECIFIC FOCAL LENGTH

(71) Applicant: Telesto GmbH, Ulm (DE)

(72) Inventor: Markus Depfenhart, Hamburg (DE)

(73) Assignee: Telesto GmbH, Ulm, Baden Wuerttemberg (DE)

( * ) Notice: Subject to any disclaimer, the term of this patent is extended or adjusted under 35 U.S.C. 154(b) by 0 days.

(21) Appl. No.: 14/452,561

(22) Filed: Aug. 6, 2014

(65) Prior Publication Data

US 2015/0049391 A1    Feb. 19, 2015

(30) Foreign Application Priority Data

Aug. 13, 2013   (EP) ..................................... 13180202

(51) Int. Cl.
| | |
|---|---|
| *G02B 1/06* | (2006.01) |
| *G02B 3/12* | (2006.01) |
| *G02B 3/14* | (2006.01) |
| *G02B 7/02* | (2006.01) |
| *G02B 26/00* | (2006.01) |

(52) U.S. Cl.
CPC *G02B 3/14* (2013.01); *G02B 7/028* (2013.01); *G02B 26/004* (2013.01)

(58) Field of Classification Search
CPC ....... G02B 3/14; G02B 26/004; G02B 26/005
USPC .................................................. 359/665, 666
See application file for complete search history.

(56) References Cited

U.S. PATENT DOCUMENTS 8,729,515 B2 *  5/2014  Hirsa et al. .................... 250/573

* cited by examiner

*Primary Examiner* — William Choi
(74) *Attorney, Agent, or Firm* — Telesto GmbH; M. Friedmann

(57) ABSTRACT

The present invention relates to a liquid lens for controlled adjustment of a variable focal length for a light transmitted through the liquid lens, comprising: a carrier having a light transmission portion for the light; a liquid drop which is highly transparent to the light and arranged on the carrier above the light transmission portion as part of a lens function; a ferrofluid which is arranged above the liquid drop so that it surrounds and contacts the liquid drop at least at those surfaces which are not directly in contact with the carrier; a magnet means arranged below the carrier and around the light transmission portion so as to draw the ferrofluid arranged on the carrier towards the carrier and keep it in its position on the carrier in all possible spatial positions of the liquid lens, which causes the liquid drop to be kept in its position on the carrier as well; and a temperature element arranged so as to be in thermal contact with the liquid drop in order to bring the liquid drop to a specific temperature and in order to alter the surface tension of the liquid drop by means of the specific temperature so as to adjust the focal length in this manner. The Invention also pertains to a corresponding method.

16 Claims, 3 Drawing Sheets

LIQUID LENS FOR CONTROLLED SETTING OF A SPECIFIC FOCAL LENGTH

The present invention relates to a liquid lens with an adjustable focal length, the liquid lens substantially comprising a carrier with a liquid drop and a temperature element. The generation of a specific temperature in the liquid drop by the temperature element results in a specific surface tension and thus in a specific focal length. A ferrofluid keeps the liquid drop on the carrier.

BACKGROUND OF THE INVENTION AND STATE OF THE ART

Optical lenses, also briefly called lenses, are known whose shape can be altered, consequently altering the focal length. The lens can consist of a jelly-like material and be altered e.g. in outer diameter for changing the focal length. Alternatively, the lens can consist of the liquid drop which, either alone or with the carrier or together with a second liquid, assumes a lens-like bulge, in this manner creating the focal length or, more generally, a lens function. The latter is called "liquid lens" and consists of an optical system which comprises at least the liquid drop and which is optically as highly transparent as possible for a light to be refracted or focused or defocused. This requires for the liquid drop, through which the light at least also penetrates and is refracted, to be also as highly transparent as possible. The liquid drop is a small amount of the liquid of which at least one side has an adjustable bulge with which the refraction can be adjusted.

From KR 10 2008 0 035 252 A, a liquid lens is known which maintains the liquid drop in a cylindrical container, the liquid being in galvanic contact with an electrode and having a conductivity such that the bulge of the liquid can be altered, and thus the lens function controlled, by means of exterior electrical fields applied with reference to the electrode.

From US 2012 0 026 599 A1, a different liquid lens is known, the liquid drop of which is located in a hole of an intermediate wall of a two-chamber carrier, an additional incompressible liquid, which does not mix with the liquid drop, being filled in on both sides up to exterior walls of a respective first and second chamber with a light inlet or an opposite light outlet, respectively.

The liquid drop in the center forms a corresponding bulge against the additional fluid, creating the lens function in this manner. The intermediate wall has a second hole between the first and the second chamber, in which there is a drop of a ferrofluid which is coupled via the additional incompressible liquid with the liquid drop by volume wise. In this manner, by drawing of the ferrofluid drop in one direction by means of a magnetic field applied from the outside, the liquid drop is drawn in the opposite direction, altering the respective bulges of the liquid drop and correspondingly the focal length with different refraction indices of the liquids.

From US 2009 0 046 195 A1, another liquid lens is known which substantially consists of a liquid drop and an adjacent ferrofluidic liquid which does not mix with the liquid drop, the liquids being arranged between two transparent walls of the carrier. The bulge causing the refraction, which bulge is located between the liquid drop and the ferrofluidic liquid, can be altered by a magnetic field applied on the outside. Here as well as in the examples below, it is a matter of course that the liquids have different refractive indices in order to create a lens function with a focal length.

From US 2002 0 196 558 A1 and US 2005 0 088 754 A9, other embodiments of liquid lenses are known where the liquid drop, which has electric conductivity and is arranged on a carrier, can be shifted and deformed by electrical fields applied on the outside. Thus, the lens function can be altered not only in focal length but also in its spatial position.

WO 2009 123 606 A discloses a variable liquid lens whose shape and, therefore, whose focus is altered by a variable pressure under the lens. The variable pressure is created by a liquid in an enclosing chamber the volume of which can be altered, for instance, by a magnetic plate in combination with an electromagnet.

U.S. Pat. No. 5,074,629 A discloses a different type of variable liquid lens where for instance a silicon layer has a cavity filled with a transparent liquid and equipped with a transparent cover, where a temperature change causes the cover to bulge and adjusts the focus. Such liquid lenses can be manufactured particularly in miniature size.

US 2007 279 757 A1 discloses a liquid lens created by an electrically conductive and an electrically non-conductive liquid which are adjacent to each other and can be altered in shape by an electrical field. The device in particular has a heating element so that the liquid lens can also be used at low temperatures and without any particular influence of the ambient temperature.

US 2008 0198 473 A1 discloses a liquid lens formed by a first and a second liquid which together form a parting layer, the second liquid being a ferrofluid. By a magnetic field applied on the outside, the shape of the ferrofluid, and in particular the parting layer between the first and the second liquid, become concave or convex as in a lens, creating a specific focus. For avoiding or reducing, in case of a strong change in focus, an optical distortion at an edge of the parting layer adjacent to the enclosure wall, the enclosure wall is embodied in accordance with the disclosure.

Difficulties resulting from many of the embodiments of a liquid lens and in practical long-term use are evaporation of the liquid drop and safely keeping the drop on the carrier. Also, deformation of the liquid drop due to electrostatic attraction or repulsion can be problematic under certain circumstances in terms of a desired lens function, since attraction or repulsion are non-linear with the displacement path. Also, for electrostatic attraction of the liquid drop in one direction, often a high voltage is necessary which is problematic in small electronic circuits or has disadvantages in terms of energy efficiency. Since the liquid drop must be conductive, not all liquids are suitable which would be suitable in terms of light transparency and refractive index.

SUMMARY OF THE INVENTION

It is therefore the object of the invention to avoid the drawbacks of the state of the art and to provide a liquid lens whose focal length is variably adjustable and for which one non-conductive liquid drop which contributes to define the focal length is sufficient, the liquid drop being safely maintained on a carrier in all spatial positions.

The above object as well as other objects to be found in the specification are achieved by a liquid lens and by a method for creating the liquid lens according to the feature combinations of the independent claims 1 and 12. Other advantageous embodiments of the invention are indicated in the dependent claims.

According to Claim 1, a liquid lens according to the invention is provided by means of which controlled adjustment of a variable focal length for light conducted through the liquid lens is possible, the liquid lens comprising:

a) a carrier having a light transmission portion, b) a liquid drop which is highly transparent for the light and arranged on the carrier above the light transmission portion as part of a lens function, c) a ferrofluid which is arranged above the liquid drop such that it surrounds and touches the liquid drop at least at those surfaces which are not directly in touch with the carrier, d) a magnetic means arranged at the carrier and around the light transmission portion such that it keeps the ferrofluid in a specific first position on the carrier in all possible spatial positions of the liquid lens, keeping the liquid drop in a second position on the carrier, and e) a temperature element arranged to be in thermal contact with the liquid drop in order to get the liquid drop to a specific temperature and in order to change the surface tension of the liquid drop, by means of the specific temperature, in order to adjust the focal length.

The liquid drop can advantageously consist of any liquid that is sufficiently transparent for the light. That is, the liquid does not need to have any conductive properties in order to be changed in shape or position, e. g. by electrodes or electrical fields. The physical effect is exploited that a bulge of the surface of the liquid drop on the carrier is determined by the temperature of the liquid drop, which allows an adjustment of the focal length of the liquid lens by alteration of the temperature. No electrical fields are necessary for this purpose, and the temperature can be adjusted easily by means of the temperature element. Especially by preferably embodying the temperature element as a Peltier element at the liquid drop, the temperature at the liquid drop can be easily and inexpensively controlled.

The difficulty of keeping the liquid drop safely on the carrier, for example during transport, is solved by the ferrofluid which surrounds the liquid drop on the carrier on all sides. Even during a rotation in space of the liquid lens contrasting the force of gravity or during acceleration, the liquid drop remains safely on the carrier. Also, the evaporation problems of the liquid drop are solved since the ferrofluid isolates the liquid drop against evaporation on all sides.

By preferably using at least one permanent magnet as the magnet means, the ferrofluid and thus the liquid drop can be held on the carrier without any additional expenditure of energy, even during transport.

Preferably, the magnet means is displaced at the liquid lens after transport and during operation of the liquid lens so that lesser magnetic forces occur on the ferrofluid and so that the shape of the ferrofluid and thus of the liquid drop are not altered as strongly by the magnetic forces. Preferably, additional magnet coils are integrated in or attached to the liquid lens so as to vary the shape of the liquid drop and thus the lens function by means of the ferrofluid located above it in a controlled manner. Preferably, the magnet coils are arranged so that they can change the height above the carrier, and/or the lateral position of the ferrofluid on the carrier, and thus of the liquid drop. Basically, changing the height of the liquid drop above the carrier means changing the bulge in the z-direction and thus the focal length of the liquid lens. A lateral displacement basically means that the focal point can be shifted in a direction perpendicular to the z-direction and thus in an x/y-plane.

Preferably, additional electrical fields are also generated which act on the liquid drop, which is in contact with an electrode, so as to additionally change or adjust the lens function. In this process as well, the focal point can additionally be shifted in the x, y or z direction.

By preferably arranging an intermediate layer with a corresponding intermediate layer liquid between the liquid drop and the ferrofluid, it can be ensured that the liquid of the liquid drop does not chemically react with the ferrofluid and thus the liquid drop or the ferrofluid are not changed chemically or optically.

By preferably arranging an additional actuator-controlled lens unit in or at the liquid lens, a medium base focal length can be set by means of the liquid lens, whereas by means of the additional actuator-controlled lens unit, quick alterations of the focal length or of the lens function can be performed.

Other advantageous features of the invention are indicated in the dependent claims or in the detailed description.

A preferred embodiment according to the present invention is represented in the attached drawings and in a detailed description, but is not intended to limit the present invention thereto.

SHORT DESCRIPTION OF THE DRAWINGS

DETAILED DESCRIPTION OF A PREFERRED EMBODIMENT

Figure 1:
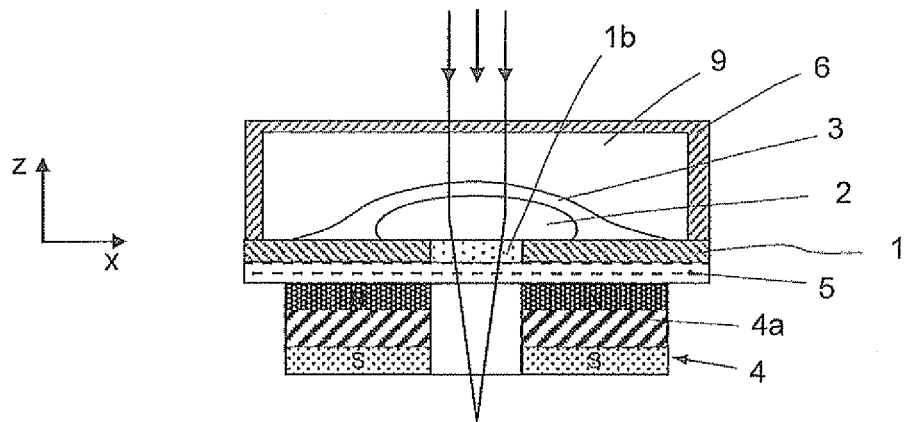
FIG. 1 shows a lateral view of a preferred embodiment of a liquid lens, the liquid lens comprising a carrier with a temperature element located below it, a liquid drop arranged on the carrier and a ferrofluid adjacent to and above the liquid drop, which is drawn against the carrier by a magnet means arranged below the carrier.

FIG. 1 shows a preferred embodiment of a liquid lens having a lens function which is an optical lens function for a light transmitted through it, at least one focal length as part of the lens function of the liquid lens being variably adjustable.

The liquid lens comprises a carrier 1 which preferably has a light transmission portion 1b at the center. Above the light transmission portion 1b on the carrier 1, a liquid drop 2 is arranged which has a bulge due to its surface tension, creating a lens function. The liquid drop 2 consists of a liquid which is as highly transparent as possible for the light transmitted through it. It is also conceivable to select the liquid such that part of the light with a wavelength range to be attenuated is particularly well absorbed. The bulge of the surface of the liquid drop 2 forms the lens function together with the carrier 1 and other optical components through which the light is transmitted. The bulge of the surface of the liquid drop 2 is determined by the surface tension of the liquid drop 2 which is a function of the temperature of the liquid drop 2. By controlling the temperature of the liquid drop 2, the bulge of the liquid drop 2 and the focal length of the liquid lens change accordingly.

Therefore, preferably, a temperature element 5 below the carrier 1 is connected to the carrier 1 with as good thermal conductivity as possible so as to be able to directly heat or cool the liquid drop 2 as quickly as possible and bring it to a desired temperature. Alternatively, the liquid drop 2 can also be positioned directly on the temperature element 5 when the temperature element 5 is highly transparent in the light transmission portion 1b. For instance, in the light transmission portion 1b, the temperature element 5 can have an inserted piece of glass. Preferably, the temperature element 5 is a Peltier element which can as a device both easily withdraw heat from the carrier 1 or the liquid drop 2 and generate heat to the carrier 1 or the liquid drop 2. Preferably, the liquid lens also comprises a temperature sensor and control electronics for inducing the specific temperature in the liquid drop 2.

Above the liquid drop 2, a ferrofluid 3 is arranged so as to surround and preferably contact the liquid drop 2 at least at those surfaces of the liquid drop 2 which are not directly in contact with the carrier 1. In other words, the liquid drop 2 on the carrier 1 is hermetically encapsulated by the ferrofluid 3, with part of the liquid drop 2 being in contact with the carrier and the rest of the liquid drop 2 being in contact with the ferrofluid 3. Thus, on the one hand, evaporation of the liquid drop 2 is prevented; on the other hand, by keeping the ferrofluid 3 substantially in a position or in a first position range on the carrier 1 by means of a magnetic field, the liquid drop 2 is also held in position or in a second position range on the carrier 1. In this manner, an excessive displacement of the liquid drop 2 on the carrier 1 can be prevented, and during operation of the liquid lens, it can be ensured that the liquid drop 2 is positioned in a specific location on the carrier 1 and in the light transmission portion 1b. Thus, the focal length and a position of a focal point can be ensured.

The magnetic field for keeping the ferrofluid 3 on the carrier 1 is generated by a magnet means 4. The magnet means 4 is arranged at the carrier 1 and around the light transmission portion 1b such as to keep the ferrofluid 3 on the carrier 1 in the first position range in all possible spatial positions of the liquid lens. Preferably, the magnet means 4 is adapted so that its magnetic field keeps the ferrofluid 3 on the carrier 1 in the first position range even up to certain acceleration values. By keeping the ferrofluid 3 in the first position range, the liquid drop 2 is in turn kept in the second position range on the carrier 1 by the ferrofluid 3.

Preferably, the magnet means 4 is embodied as a permanent magnet 4a. Preferably, the magnet means 4 is arranged below the carrier 1 so as to draw the ferrofluid 3, which encapsulates the liquid drop 2 and is in contact with the carrier 1, against the carrier 1 and thus to prevent the ferrofluid 3 from moving away from the carrier 1. Alternatively or in addition, the magnet means 4 can comprise at least one electric magnetic coil by means of which the magnetic field or other superimposed magnetic fields can be generated. By preferably arranging magnetic coils laterally as well, the lens function can be set so that the focal point cannot only be adjusted in the z direction but also on an x/y plane perpendicular thereto.

Preferably, the liquid lens comprises other up- or downstream lenses for creating the lens function comprising the focal length and/or the shifting of the focal point on the perpendicular x/y plane. The lens function for instance has a basic focal length and an additional variable, adjustable focal length which can be determined by the temperature.

Preferably, the carrier 1 is concave or convex in a lens-like manner in the light transmission portion 1b so as to generate a refracting power.

Preferably, the carrier 1 has the shape of a plate, a trough or a bowl.

Preferably, the carrier 1 at least partially consists of a glass or a glass composite material.

Preferably, the liquid lens also has a cover 6 above the carrier 1 which protects the liquid drop 2 and the ferrofluid 3 e. g. against impurities. The cover 6 can be an integral part of the carrier 1 and e. g. bear the shape of a rectangular tube which lies flat and which is closed on the side after the liquid drop 2 and the ferrofluid 3 have been filled in.

Preferably, a volume of a chamber 9 of the liquid lens between the carrier 1 and the cover 6, within which the liquid drop 2 and the ferrofluid are positioned, is completely filled with liquid. Thus, a relatively weak magnetic field can keep the ferrofluid 3 in the first position range and no forces of gravity or acceleration can directly displace it from its position. Preferably, the chamber volume is substantially filled by the liquid drop 2 and by the ferrofluid 3. It is also conceivable to fill an additional liquid into the chamber 9 in order to make it full. The liquids within the chamber 9 of the liquid lens are selected such that they cannot mix.

Preferably, the liquid drop 2 consists either of water, an alcohol, glycerine or a mixture with at least one portion thereof.

Figure 2:
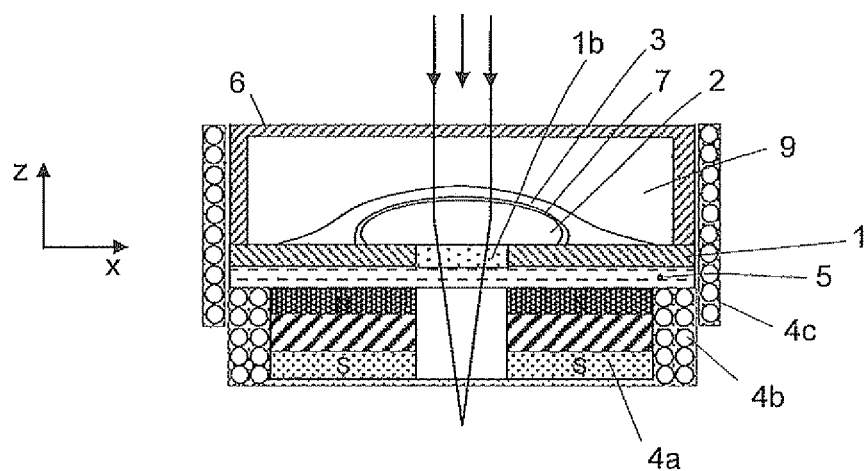
FIG. 2 shows a lateral view of a preferred embodiment of the liquid lens, broadened in comparison to the embodiment in FIG. 1, wherein between the liquid drop and the ferrofluid, an intermediate layer of an intermediate layer liquid is arranged so as to chemically separate the liquid drop from the ferrofluid. In addition, further magnet means are arranged at the liquid lens.

FIG. 2 shows a different embodiment of the liquid lens according to FIG. 1. It shows that preferably, an intermediate layer liquid 7 can be arranged and interposed generally between the liquid drop 2 and the ferrofluid 3. The ferrofluid 3 is spaced from the liquid drop 2 only by a thin layer of the intermediate layer liquid 7. The intermediate layer liquid 7 preferably performs the function of a chemical separation between the ferrofluid 3 and the liquid drop 2 so that they mingle less and/or to avoid a chemical reaction between the liquid drop 2 and the ferrofluid 3. Preferably, the intermediate layer liquid 7 consists of an oil. Alternatively, the ferrofluid 3 directly contacts the liquid drop 2.

FIG. 2 also shows that the magnet means 4 of a different preferred embodiment comprises at least one magnetic coil 4b, 4c, 4d by means of which the ferrofluid 3 can be magnetically drawn in at least one direction on the carrier 1, controlled by current. Alternatively or together with a permanent magnet 4a, a first magnetic coil 4b under electric current generates the magnetic field by means of which the ferrofluid 3 is drawn towards the carrier 1. A second magnetic coil 4c under electric current can overlay an additional magnetic field.

It is also conceivable to partially compensate a magnetic field created by a permanent magnet 4a by means of at least one magnetic coil so as to maintain, on the one hand, a magnetic force for stabilizing the position of the ferrofluid 3 during transport and, on the other hand, be able to compensate and, so to speak, switch off the magnetic field of the permanent magnet 4a after transport and during operation of the liquid lens so as to minimize the effect of the ferrofluid 3 on the shape of the liquid drop 2 during operation.

Preferably, the magnet means 4 comprises the permanent magnet 4a as a fixed part of the liquid lens.

Alternatively, the magnet means 4 comprises the permanent magnet 4a as a mechanically displaceable and controllable part of the liquid lens.

Figure 3:
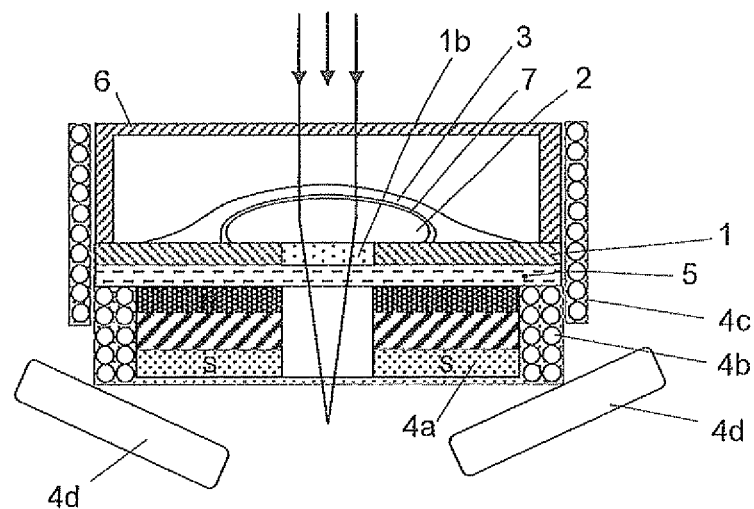
FIG. 3 shows a lateral view of the preferred embodiment of the liquid lens according to FIG. 2, additional magnet means for lateral magnetic attraction of the ferrofluid being arranged at the liquid lens.

FIG. 3 schematically shows an embodiment of the liquid lens which has third magnetic coils 4d in addition to those shown in FIG. 2. By preferred lateral arrangement of the third magnet coils 4d under current, the ferrofluid is also shifted on an x/y-plane perpendicular to the light beam and in the z-direction, or altered in shape, making the lens function of the liquid drop 2 and the focal point of the light displaceable in the direction perpendicular to the direction of light incidence.

Figure 4:
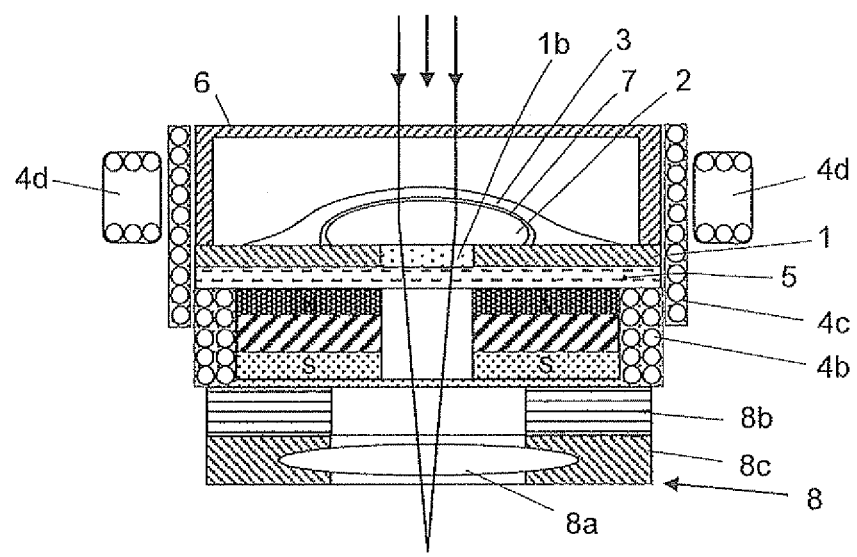
FIG. 4 shows a lateral view of the preferred embodiment of the liquid lens according to FIG. 3, an actuator-controlled additional lens unit being arranged at the liquid lens.

FIG. 4 schematically shows an embodiment of the liquid lens comprising an actuator-controlled additional lens unit 8 in addition to the one in FIG. 3. The actuator-controlled additional lens unit 8 can be located up- or downstream of all embodiments described herein and is an important supplement to the liquid lens. In the preferred embodiment shown, the actuator-controlled additional lens unit 8 comprises an additional lens 8a clamped in a holding element 8c, the holding element 8c being connected to one of the embodiments of the liquid lens described above via an actuator 8b. The actuator 8b can be, for instance, a Piezo actuator or another lifting actuator or a motor-operated actuator by means of which the additional lens 8a can be shifted in the light beam which also passes through the liquid lens so as to change and adjust the focal length of the entire liquid lens.

In particular, the actuator-controlled additional lens unit 8 allows quicker changes of the focal length than would be possible by changing the temperature of the liquid drop. The temperature of the liquid drop 2 preferably creates a basic focal length or basic lens function; with the actuator-controlled additional lens unit 8, the desired actual focal length is set, which can vary within a certain range from the basic focal length.

Figure 5:
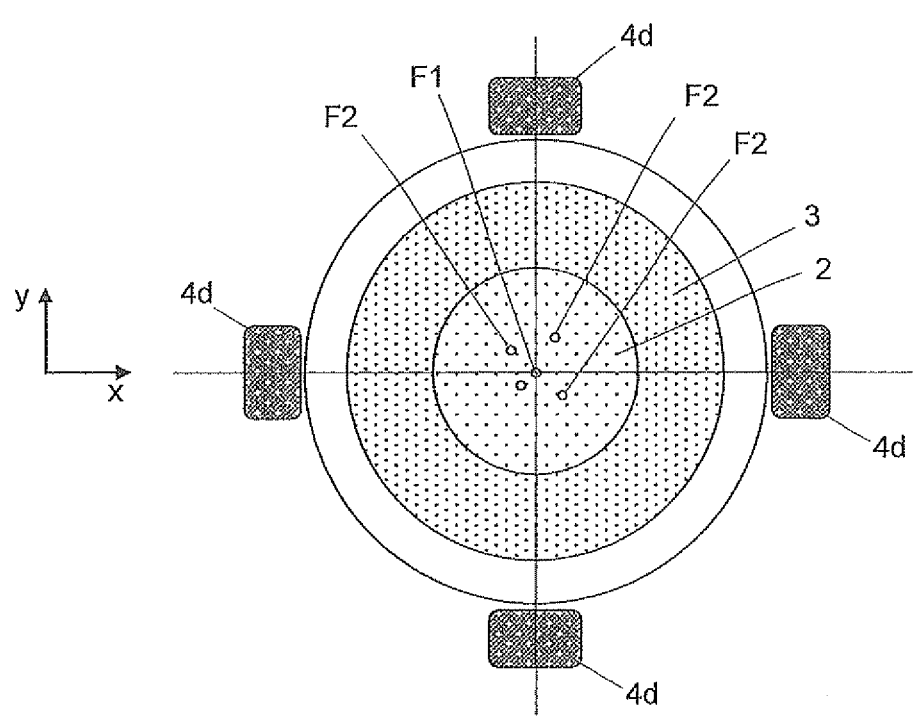
FIG. 5 shows a schematic top view of the embodiment of the liquid lens according to FIG. 4 with the additional magnet means for lateral magnetic attraction of the ferrofluid, wherein possible points of focus being activated are shown by way of example in an x-y plane.

FIG. 5 shows in a schematic top view a liquid lens with third magnetic coils 4d arranged laterally, with different focal points F1, F2 being shown by way of example on the x/y plane to illustrate that the focal point can be preferably set both in the center and outside the center.

In an embodiment which is not illustrated, the magnet means 4 is arranged, in case the chamber 9 is completely filled, above the ferrofluid 3 in order to easily keep the ferrofluid 3 in its first position range. After a transport and during operation of the liquid lens, the magnet means 4 is spaced further from the ferrofluid 3 or the magnetic field is reduced in order to exert lesser force on the ferrofluid 3. By lesser magnetic force on the ferrofluid 3, the bulge by the surface tension of the liquid drop 2 is less disturbed.

Preferably, the amount of liquid in the liquid drop 2 is of no importance. However, a small amount is preferred since it allows a faster change in temperature than is the case with larger amounts.

Preferably, a ferrofluid amount of the ferrofluid 3 is of no importance as well.

Generating the variable, adjustable focal length for the light passing through the liquid lens preferably comprises the following steps:
a) arranging the liquid drop 2 on the carrier 1 of the liquid lens so that the light is transmitted through the liquid drop,
b) arranging the temperature element 5 so that it is in thermally conductive contact with the liquid drop 2,
c) controlling the determined temperature of the liquid drop 2 in order to control the surface tension and, by the surface tension, the lens-like bulge of the liquid drop 2, which contributes to determining the focal length of the liquid lens,
d) arranging the ferrofluid 3 above the liquid drop 2 on the carrier 1 so that it surrounds and contacts the liquid drop 2 at least at those surfaces which are not directly in contact with the carrier 1, and
e) arranging a magnet means 4 at the carrier 1 in order to keep the ferrofluid 3 in the first position range on the carrier 1 in all possible spatial positions of the liquid lens, which causes to keep the liquid drop 2 in the second position range on the carrier 1.

Other possible embodiments or method steps are described in the following claims. In particular, the different features of the embodiments described above can also be combined, provided they are not technically incompatible.

The reference numbers in the claims are indicated for better comprehensibility, but do not limit the claims to the forms represented in the figures.

LIST OF REFERENCE NUMBERS 1 carrier
1b light transmission portion
2 liquid drop
3 ferrofluid
4 magnet means
4a permanent magnet
4b first magnet coil
4c second magnet coil
4d third magnet coil
5 temperature element
6 cover
7 intermediate layer
8 additional lens unit
8a additional lens
8b actuator
8c holding element
9 chamber

The invention claimed is:

1. Liquid lens for controlled adjustment of a variable focal length for a light transmitted through the liquid lens, comprising:
   a) a carrier having a light transmission portion for the light;
   b) a liquid drop which is highly transparent to the light and arranged on the carrier above the light transmission portion as part of a lens function;
   c) a ferrofluid which is arranged above the liquid drop so that it surrounds and contacts the liquid drop at least at those surfaces which are not directly in contact with the carrier;
   d) a magnet means arranged below the carrier and around the light transmission portion so as to draw the ferrofluid arranged on the carrier towards the carrier and keep it in its position on the carrier in all possible spatial positions of the liquid lens, which causes the liquid drop to be kept in its position on the carrier as well; and
   e) a temperature element arranged so as to be in thermal contact with the liquid drop in order to bring the liquid drop to a specific temperature and in order to alter the surface tension of the liquid drop by means of the specific temperature so as to adjust the focal length in this manner.

2. Liquid lens according to claim 1, wherein the temperature element is adapted to be able to both heat the liquid drop in a controlled manner and to cool it.

3. Liquid lens according to claim 1, wherein the temperature element is a Peltier element.

4. Liquid lens according to claim 1, wherein the temperature element comprises a temperature sensor and control electronics for generating the specific temperature in the liquid drop.

5. Liquid lens according to claim 1, the carrier having the shape of a plate, a trough or a bowl.

6. Liquid lens according to claim 1, the carrier having a lens-like concave or convex shape in the light transmission portion in order to generate a predefined refracting power.

7. Liquid lens according to claim 1, the carrier consisting at least partially of a glass or a glass composite material.

8. Liquid lens according to claim 1, the liquid drop consisting either of water, an alcohol, glycerine or of a mixture with at least one part thereof.

9. Liquid lens according to claim 1, the ferrofluid adjoining either directly on the liquid drop; or the ferrofluid being spaced from the liquid drop only by a thin intermediate layer liquid, where the intermediate layer liquid is intended for chemical separation between the ferrofluid and the liquid drop and does not mix with the liquid drop and the ferrofluid.

10. Liquid lens according to claim 9, wherein the intermediate layer liquid consists of an oil.

11. Liquid lens according to claim 1, the magnet means comprising a permanent magnet which is fixedly arranged in the liquid lens.

12. Liquid lens according to claim 1, the magnet means comprising a permanent magnet which is arranged mechanically adjustably and controllably in the liquid lens.

13. Liquid lens according to claim 1, the magnet means comprising at least one magnetic coil by means of which the ferrofluid on the carrier can be magnetically attracted in at least one direction, controlled by electric current, or with which the magnetic field of a permanent magnet can be at least partially compensated by current control.

14. Liquid lens according to claim 1, the magnet means comprising at least one magnetic coil by means of which the shape of the ferrofluid on the carrier can be changed, controlled by current, on a plane substantially perpendicular to the direction of light incidence so as to shift a focal point of the light in a direction perpendicular to the direction of light incidence.

15. Liquid lens according to claim 1, further comprising an actuator-controlled additional lens unit which is optically arranged in the optical path of the light so as to be able to induce quicker changes of the focal length with the additional lens unit than would be possible via the temperature of the liquid drop.

16. Method for creating an adjustable, variable focal length for a light through a liquid lens, comprising the following steps:
 a) arranging a liquid drop on a carrier of the liquid lens so that the light passes through the liquid drop,
 b) arranging a ferrofluid above the liquid drop on the carrier so that it surrounds and contacts the liquid drop at least at the surfaces not directly in contact with the carrier,
 c) arranging of a magnet means below the carrier for drawing the ferrofluid arranged on the carrier towards the carrier and keeping it in its position on the carrier in all possible spatial positions of the liquid lens, which causes to keep the liquid drop in its position on the carrier as well,
 d) arranging of a temperature element so as to be in thermally conductive contact with the liquid drop, and
 e) controlling of a specific temperature of the liquid drop so as to control a surface tension and, by the surface tension, a lens-like bulge of the liquid drop, which controls the focal length of the liquid lens.

* * * * *